United States Patent
Yamaoka

(10) Patent No.: US 9,477,578 B2
(45) Date of Patent: Oct. 25, 2016

(54) SEQUENCE-PROGRAM-DEBUGGING SUPPORTING APPARATUS

(75) Inventor: Takayuki Yamaoka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 14/374,816

(22) PCT Filed: Mar. 26, 2012

(86) PCT No.: PCT/JP2012/057826
§ 371 (c)(1),
(2), (4) Date: Jul. 25, 2014

(87) PCT Pub. No.: WO2013/145105
PCT Pub. Date: Oct. 3, 2013

(65) Prior Publication Data
US 2015/0301923 A1    Oct. 22, 2015

(51) Int. Cl.
G06F 9/44       (2006.01)
G06F 11/36      (2006.01)
G05B 19/05      (2006.01)

(52) U.S. Cl.
CPC .......... *G06F 11/3624* (2013.01); *G05B 19/05* (2013.01); *G06F 11/3636* (2013.01)

(58) Field of Classification Search
CPC ........................ G06F 11/3636; G05B 19/05
See application file for complete search history.

(56) References Cited

U.S. PATENT DOCUMENTS

| | | | |
|---|---|---|---|
| 6,353,896 B1 * | 3/2002 | Holzmann | G06F 8/436 714/38.1 |
| 6,502,102 B1 * | 12/2002 | Haswell | G06F 11/3664 |
| 7,203,931 B2 | 4/2007 | Minamide et al. | |
| 8,117,587 B1 * | 2/2012 | Testardi | G06F 8/447 717/100 |
| 2002/0059567 A1 | 5/2002 | Minamide et al. | |
| 2003/0046016 A1 * | 3/2003 | Grey | G06F 11/2273 702/119 |
| 2005/0193263 A1 * | 9/2005 | Watt | G06F 11/3664 714/38.1 |

(Continued)

FOREIGN PATENT DOCUMENTS

| | | |
|---|---|---|
| DE | 10116809 A1 | 5/2002 |
| DE | 112008001078 T5 | 2/2010 |

(Continued)

OTHER PUBLICATIONS

Communication dated May 8, 2015 from the German Patent Office in counterpart application No. 112012006107.1.

(Continued)

*Primary Examiner* — Chameli Das
(74) *Attorney, Agent, or Firm* — Sughrue Mion, PLLC

(57) ABSTRACT

A sequence-program-debugging supporting apparatus includes a configuration editing unit that receives a disabling unit from a PLC, a variable retaining unit that retains variables used by units on a sequence program, a program editing unit that can edit the sequence program, a converting unit that converts the sequence program into an execution code, a searching unit that acquires variables used by the disabling unit from the variable retaining unit and searches for places where the acquired variables are used in the sequence program, and a disabling setting unit that writes a section of the execution code corresponding to the places in a disabling section setting file as a disabling section not to be executed, and an execution control unit that controls, based on the disabling section setting file, an executing unit not to execute the disabling section.

3 Claims, 12 Drawing Sheets

(56) References Cited

U.S. PATENT DOCUMENTS

| | | | | |
|---|---|---|---|---|
| 2006/0116777 | A1* | 6/2006 | Dax et al. | G05B 19/056 700/18 |
| 2007/0162894 | A1* | 7/2007 | Noller | G06F 11/3688 717/124 |
| 2007/0260823 | A1* | 11/2007 | Dickinson et al. | G06F 11/2242 711/153 |
| 2010/0083235 | A1 | 4/2010 | Hozoji et al. | |
| 2010/0153924 | A1* | 6/2010 | Andrews | G06F 11/3688 717/126 |
| 2013/0117812 | A1* | 5/2013 | Ponchel | G06F 21/552 726/1 |
| 2015/0160716 | A1* | 6/2015 | Hiraoka et al. | G06F 1/3253 713/320 |

FOREIGN PATENT DOCUMENTS

| | | |
|---|---|---|
| JP | 11-282515 A | 10/1999 |
| JP | 2002-244703 A | 8/2002 |
| JP | 2005-044316 A | 2/2005 |
| JP | 2008-059421 A | 3/2008 |
| JP | 2009-193276 A | 8/2009 |
| JP | 2009-223398 A | 10/2009 |
| JP | 2010-224597 A | 10/2010 |

OTHER PUBLICATIONS

International Search Report dated Apr. 17, 2012, issued by the International Searching Authority in counterpart PCT/JP2012/057826.

* cited by examiner

Related Art

FIG.8

[UNIT VARIABLE TYPE LIST]

| UNIT TYPE | USE VARIABLE TYPE LIST | DATA TYPE |
|---|---|---|
| Q04-TYPE INPUT UNIT | INPUT1, INPUT2, INPUT3, INPUT4 | BOOL TYPE |
| Q04-TYPE OUTPUT UNIT | OUTPUT1, OUTPUT2, OUTPUT3, OUTPUT4 | BOOL TYPE |

FIG.9

[UNIT USE VARIABLE NAME LIST]

| UNIT NAME | USE VARIABLE NAME LIST | DATA TYPE |
|---|---|---|
| INPUT UNIT 1 | X0, X1, X2, X3 | BOOL TYPE |

FIG.10

| PLACE OF USE (CIRCUIT BLOCK) | VARIABLE IN USE |
|---|---|
| CIRCUIT BLOCK OF STEP NUMBER (0) | X0 |
| CIRCUIT BLOCK OF STEP NUMBER (4) | X1 |
| CIRCUIT BLOCK OF STEP NUMBER (10) | X2 |

FIG.11

[CORRESPONDENCE BETWEEN LADDER PROGRAM AND EXECUTION SECTION]

| LADDER PROGRAM (CIRCUIT BLOCK) | START STEP NUMBER | END STEP NUMBER |
|---|---|---|
| CIRCUIT BLOCK OF STEP NUMBER (0) | 0 | 1 |
| CIRCUIT BLOCK OF STEP NUMBER (2) | 2 | 3 |
| CIRCUIT BLOCK OF STEP NUMBER (4) | 4 | 6 |
| CIRCUIT BLOCK OF STEP NUMBER (7) | 7 | 9 |
| CIRCUIT BLOCK OF STEP NUMBER (10) | 10 | 12 |

FIG.12

[DISABLING SECTION SETTING
(CONTENT OF DISABLING SECTION SETTING FILE)]

| START STEP NUMBER | END STEP NUMBER |
|---|---|
| 0 | 1 |
| 4 | 6 |
| 10 | 12 |

SEQUENCE-PROGRAM-DEBUGGING SUPPORTING APPARATUS

CROSS REFERENCE TO RELATED APPLICATIONS

This application is a National Stage of International Application No. PCT/JP2012/057826 filed Mar. 26, 2012, the contents of all of which are incorporated herein by reference in their entirety.

FIELD

The present invention relates to a sequence-program-debugging supporting apparatus.

BACKGROUND

For example, during an operation check in debugging work for a sequence program for a programmable logic controller (PLC) system, when it is desired not to execute only an operation program concerning a specific unit in the system, it is necessary to perform a series of operation explained below in an engineering tool in the past.

(1) Search for a list of variables used in the program concerning a target unit. (2) Specify (a plurality of) places of the program where the searched variables are used. (3) Make the specified program disable (not to execute). Specifically, perform editing operation for, for example, backing up and deleting the program or commenting out the program. (4) Compile the program (into an execution code). (5) Write the compiled execution code in a programmable logic controller (PLC). (6) Restart the programmable logic controller (PLC).

For example, Patent Literature 1 discloses a technology for disabling execution of a specific step.

CITATION LIST

Patent Literature

Patent Literature 1: Japanese Patent Application Laid-Open No. 2008-59421

SUMMARY

Technical Problem

As explained above, according to the related art, there is a problem in that man-hour of the debugging work for the sequence program increases.

The present invention has been devised in view of the above and it is an object of the present invention to obtain a sequence-program-debugging supporting apparatus capable of greatly reducing man-hour of debugging work for a sequence program for performing an operation check without executing a program related to a specific unit.

Solution to Problem

The present invention is directed to a sequence-program-debugging supporting apparatus that achieves the object. The sequence-program-debugging supporting apparatus includes an engineering tool. The engineering tool includes a unit-configuration-display editing unit that receives a disabling unit selected by a user from units included in a programmable logic controller; a unit-variable retaining unit that retains, for each of the units, variable used by the units on a sequence program executed by the programmable logic controller; a program-display editing unit with which the user can edit the sequence program; a program storing unit that stores the sequence program; a program converting unit that converts the sequence program into an execution code executable by a program executing unit of the programmable logic controller; a variable-use-place searching unit that acquires variables used by the disabling unit from the unit-variable retaining unit and searches for places where the acquired variables are used in the sequence program; and an execution-disabling setting unit that writes a section of the execution code corresponding to the places in a disabling section setting file, as a disabling section not to be executed. The sequence-program-debugging supporting apparatus further includes an execution control unit that controls, on the basis of the disabling section setting file, the program executing unit not to execute the disabling section.

Advantageous Effects of Invention

The sequence-program-debugging supporting apparatus according to the present invention has an effect that it is possible to greatly reduce man-hour of debugging work for a sequence program.

BRIEF DESCRIPTION OF DRAWINGS

FIG. 8 is a diagram of a unit variable type list, which is a list of types of variables for each of unit types.

FIG. 9 is a diagram of a unit use variable name list, which is a list of unit names and variable names of the unit names in a PLC system.

FIG. 10 is a diagram of places where variables used by a selected unit are used in a sequence program.

FIG. 11 is a diagram of correspondence between a sequence program (a ladder program) and an execution code.

FIG. 12 is a diagram of contents of a disabling section setting file.

DESCRIPTION OF EMBODIMENTS

For example, during an operation check in debugging work for a sequence program for a programmable logic controller (PLC) system, when it is desired not to execute only an operation program concerning a specific unit in the system, it is necessary to perform a series of operation shown in FIG. 1 explained below in an engineering tool in the past.

Figure 1:
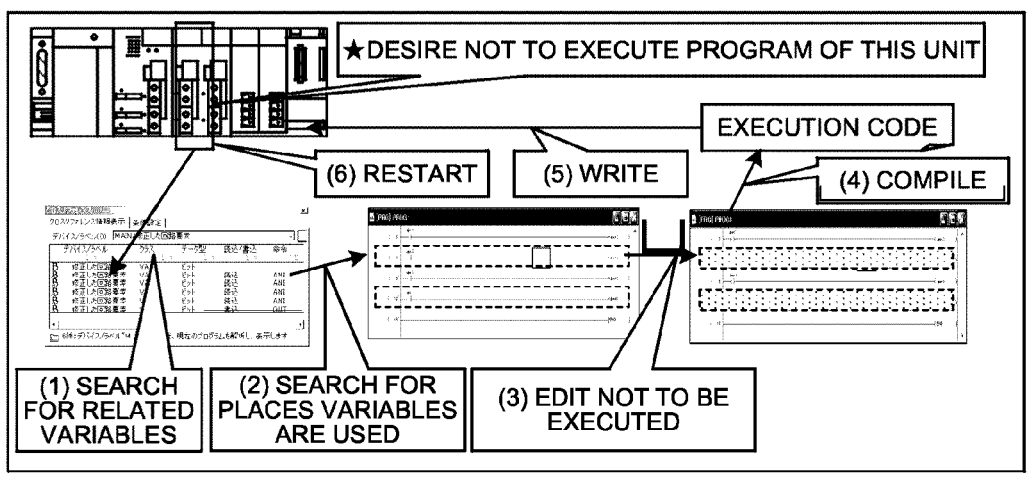
FIG. 1 is a diagram of operation necessary when it is desired not to execute only an operation program concerning a specific unit in an engineering tool in the past.

First, in (1) in FIG. 1, search for a list of variables used in the program concerning a target unit. In (2), specify (a plurality of) places of the program where the searched variables are used. In (3), edit the program not to execute the specified program. Specifically, perform editing operation for, for example, backing up and deleting the program or commenting out the program. In (4), compile the program (into an execution code). In (5), write the compiled execution code in a programmable logic controller (PLC). Lastly, in (6), restart the programmable logic controller (PLC).

As explained above, in the engineering tool in the past, there is a problem in that man-hour of the debugging work increases.

A sequence-program-debugging supporting apparatus 50 in FIG. 2 according to embodiments of the present invention is explained in detail below on the basis of the drawings. Note that the present invention is not limited by the embodiments.

First Embodiment

Figure 2:
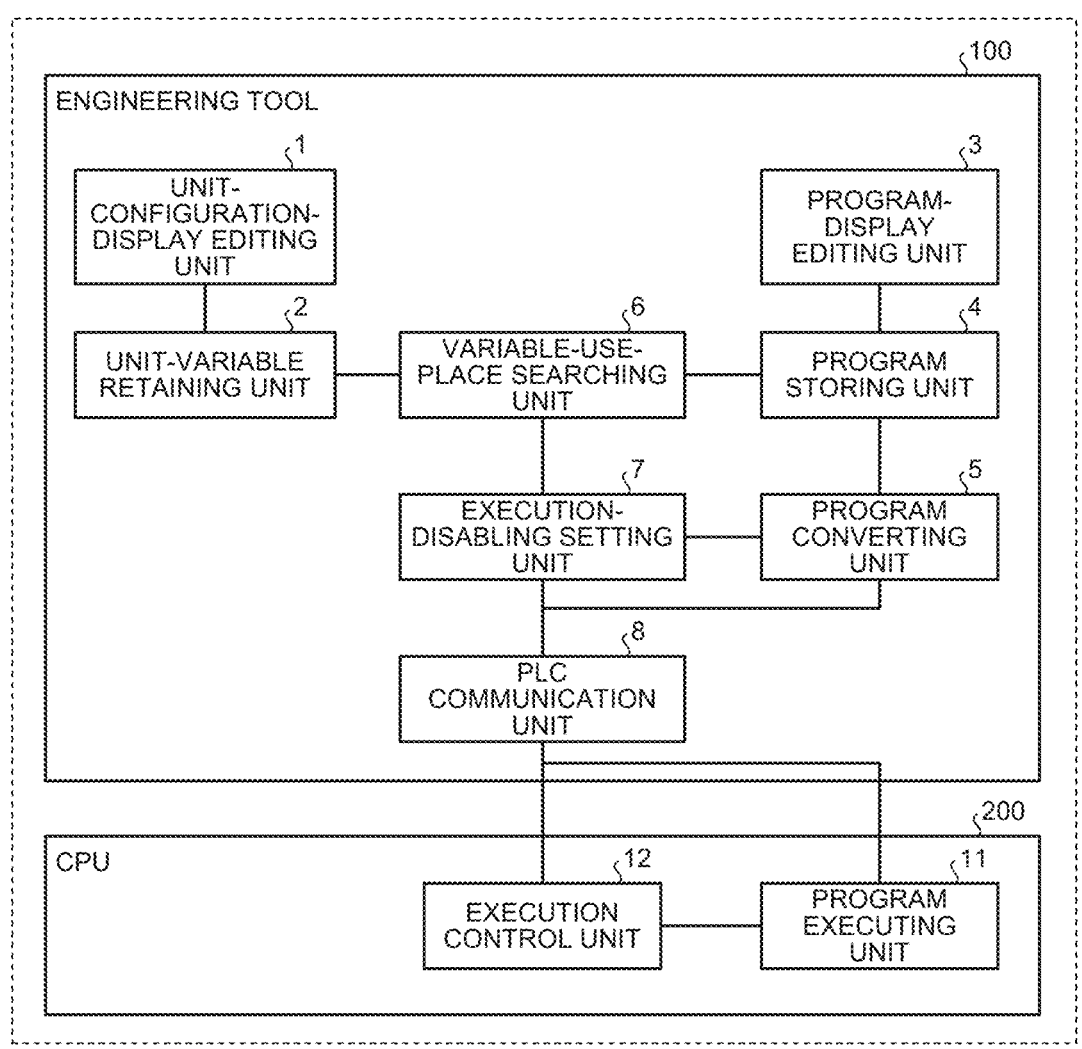
FIG. 2 is a diagram of a basic configuration of a sequence-program-debugging supporting apparatus according to a first embodiment.

A basic configuration of the sequence-program-debugging supporting apparatus 50 according to a first embodiment of the present invention is shown in FIG. 2. As a basic configuration for realizing the sequence-program-debugging supporting apparatus 50, a configuration including an engineering tool 100, which is a personal computer or the like installed with engineering tool software, and a CPU 200 (hardware) of a programmable logic controller (PLC), which executes a program created by the engineering tool 100, is conceivable. The CPU 200 is a part of a programmable logic controller (PLC) main body (the entire main body is not shown).

An overview of the components is explained below. The engineering tool 100 is a tool for editing a program operated in a PLC system. The engineering tool 100 can be realized by, for example, a personal computer or the like installed with engineering tool software. The engineering tool 100 includes processing units explained below.

Figure 3:
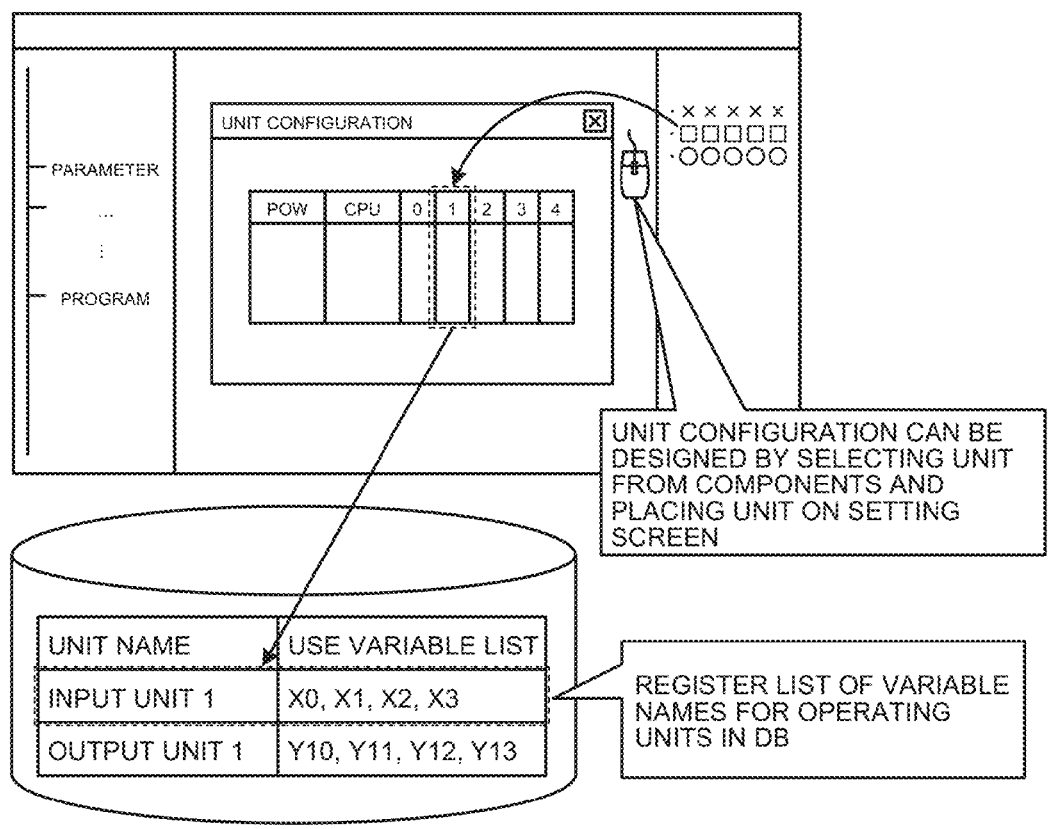
FIG. 3 is a diagram of an image of a unit-configuration-display editing unit according to the first embodiment.

Unit-Configuration-Display Editing Unit 1:

A unit-configuration-display editing unit 1 is an editor that can set a unit configuration used in the PLC system. An image of the unit-configuration-display editing unit 1 is shown in FIG. 3. Units that can be set as components in the unit-configuration-display editing unit 1 include an input/output unit, an AD conversion unit, and a positioning unit. The unit-configuration-display editing unit 1 can receive a disabling unit selected by a user from units included in the PLC system.

Unit-Variable Retaining Unit 2:

A unit-variable retaining unit 2 retains correspondence between units and a list of variables for operating the units as, for example, a database (DB). For example, information indicating that, for example, variables having names "X0, X1, X2, and X3" correspond to "input unit 1" as shown in FIG. 3 is retained in the unit-variable retaining unit 2 as a database. The unit-variable retaining unit 2 is included in a storage of the personal computer installed with the engineering tool software, a storage device, or the like.

Figure 4:
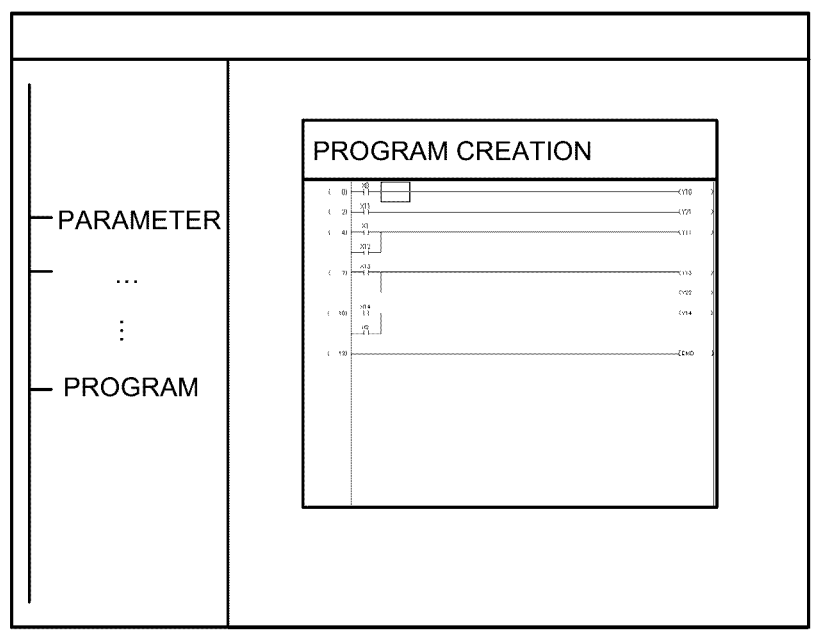
FIG. 4 is a diagram of an image in which a ladder program is displayed in a program-display editing unit (a ladder editor).

Program-Display Editing Unit 3:

A program-display editing unit 3 is an editor that can edit a program code executed by the CPU 200. In the PLC system, a ladder language is often used. Therefore, an image of the program-display editing unit 3 corresponding to the ladder language is shown in FIG. 4.

Program Storing Unit 4:

A program storing unit 4 stores the program code created by the program-display editing unit 3. For example, basic constituent elements of the program code created by the ladder language are a circuit symbol and a variable. The circuit symbol represents processing in the PLC system such as a contact and a coil. The variable represents a target of the processing. The program storing unit 4 is included in the storage of the personal computer installed with the engineering tool software, the storage device, or the like.

Program Converting Unit 5:

A program converting unit 5 is, specifically, a compiler. The program converting unit 5 converts the program code retained in the program storing unit 4 into an execution code executable by the CPU 200. The execution code is an arrangement of processing executed by the CPU 200 and is represented as a sequence of commands including instructions and operands of the instructions. Numbers (hereinafter referred to as "step numbers") equivalent to execution order are given to the commands in the command sequence.

Variable-Use-Place Searching Unit 6:

A variable-use-place searching unit 6 designates a variable and a program and searches for and outputs a list of places where the variable is used in the program. For example, when a variable "X0" is used in a fifth circuit symbol in a later program (a program written in the ladder language) retained in the program storing unit 4, the variable-use-place searching unit 6 outputs a result "fifth" as a use place search result of "X0".

Execution-Disabling Setting Unit 7:

A execution-disabling setting unit 7 sets a section not to be executed (a disabling section) in an execution code and writes the section in a disabling section setting file. As a designation method for the disabling section, for example, there is a method of designating a start step number and an end step number in a target execution code.

PLC Communication Unit 8:

A PLC communication unit 8 provides a function for writing the execution code and the disabling section setting file.

The processing units of the CPU 200 are explained. The CPU 200 is hardware for executing the execution code and includes a program executing unit 11 and an execution control unit 12.

Program Executing Unit 11:

The program executing unit 11 is hardware of a core portion of the CPU 200 that executes processing of the execution code.

Execution Control Unit 12:

The execution control unit 12 reads the content of the disabling section setting file and controls execution by the program executing unit 11 according to the content. For example, the execution control unit 12 can perform execution control of content "the execution code from a step number 5 to a step number 10 is not executed". The function of the execution control unit 12 is realized as a function of an OS or firmware operating on the CPU 200.

A function for "not executing a program related to a specific unit" during debugging of a program for the PLC system is realized by the sequence-program-debugging supporting apparatus 50 including the configuration explained above. When it is desired to check an operation performed when a specific unit is removed from the PLC system because of a trouble or the like, such a function is demanded such that the user can disable execution of a program used by the specific unit and check the operation. As preconditions for the function, registration of unit variables as a list, creation of a ladder program, and writing of an execution code explained below need to be performed.

(Registration of Unit Variables as a List)

To build the PLC system, it is necessary to determine a unit configuration such as a power supply, a CPU, and input/output. An image of operation for creating the unit configuration is explained with reference to FIG. 3 as an example. The unit configuration is created by repeating drag and drop of units from a component list in the unit-configuration-display editing unit 1.

In creating the unit configuration, a list of variables for operating selected and arranged units is registered in the unit-variable retaining unit 2. It is assumed that a "unit variable type list" (FIG. 8), which is a list of types of variables, prepared for operating selected units is retained in advance in a database or the like of the unit-variable retaining unit 2 as information corresponding to the units. A "unit type" in FIG. 8 means a product name. When the unit configuration is created, processing for reading out [unit variable type lists] of selected units, giving specific variable names to the [unit variable type lists], and recording a [unit use variable name list] (FIG. 9), which is a correspondence between a list of the variable names and unit names, in the unit-variable retaining unit 2 is performed. A "unit name" in FIG. 9 is a name of a unit in the PLC system. In FIG. 9, a generation image of data obtained when "operation for selecting a 'Q04-type input unit' and adding the 'Q04-type input unit' to the unit configuration" is performed in the unit-configuration-display editing unit 1 shown in FIG. 3 is shown. When the "Q04-type input unit" is selected from the component list, content of FIG. 9 including the list of variables used for operating the unit is added and recorded in the unit-variable retaining unit 2 on the basis of a first row of FIG. 8.

(Creation of a Ladder Program)

Figure 6:
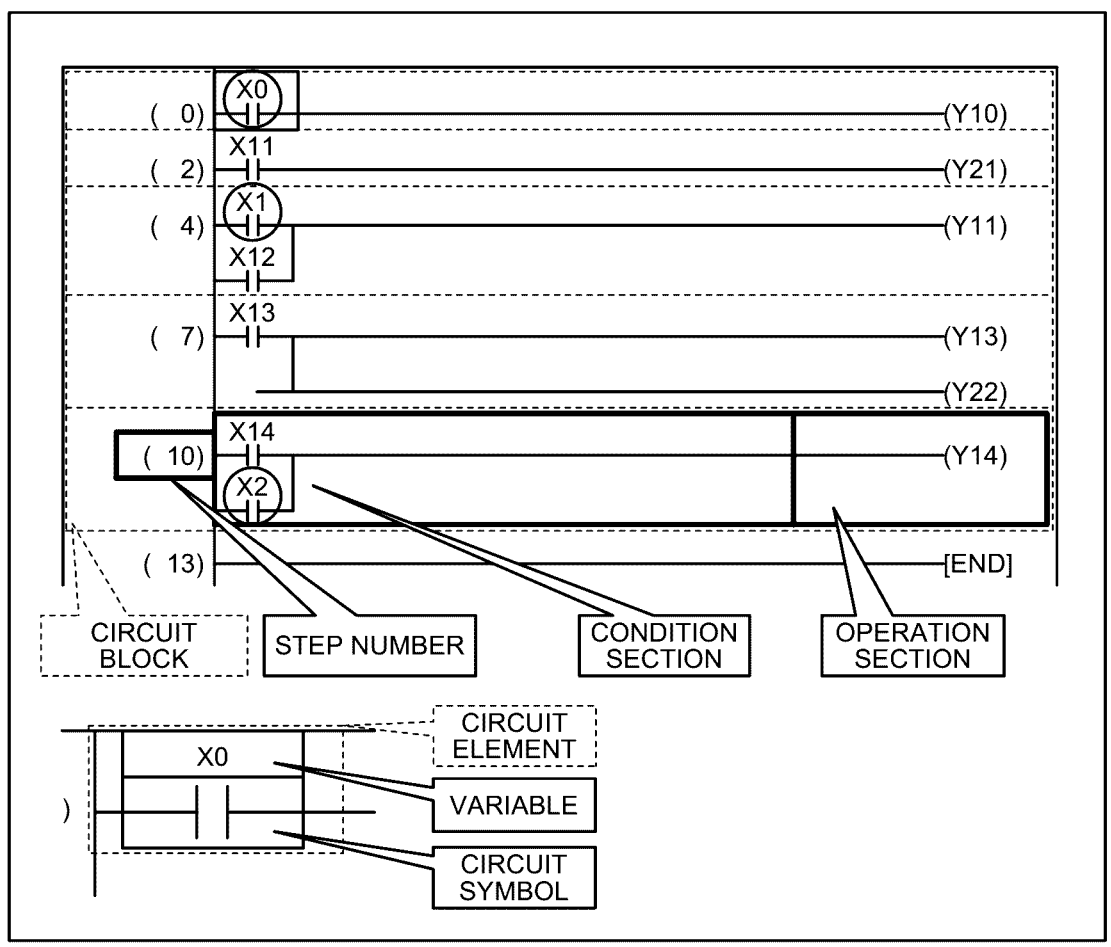
FIG. 6 is a diagram of a state of a basic configuration of the ladder program

A ladder program is created using a ladder editor as a specific example of the program-display editing unit 3. An image in which a ladder program is displayed in the program-display editing unit 3 (the ladder editor) is shown in FIG. 4. A state of a basic configuration of the ladder program is shown in FIG. 6. The basic configuration of the ladder program is explained with reference to FIG. 6. For simplification of the explanation, it is assumed that circuit elements, which are elements of the ladder program, are only a contact (an "a" contact) and a coil. This embodiment is also effective for ladder programs in which other circuit symbols (instructions) are used.

An overview of the ladder program is explained. As shown in FIG. 6, in the ladder program, "circuit blocks" are arranged in execution order. The circuit block includes one "condition section" and one "operation section". The "condition section" is a group of circuits, contacts of which are connected in series or in parallel. The "operation section" is a group of circuits, coils of which are connected in series. "Step numbers" are attached to the "circuit blocks". The "step numbers" are identifiers for specifying the "circuit blocks" in the entire program and indicate execution order in the PLC system.

An operation in one "circuit block" executes the "operation section" of the "circuit block" when the "condition section" of the "circuit block" is conducted. Therefore, in debugging work for the ladder program, when it is desired not to execute a specific "circuit block", a method of, for example, connecting a connect, which is always OFF (non-conducted), to the "condition section" in series has been adopted.

The contact and the coil are referred to as circuit elements. The circuit elements include circuit symbols and variables. The circuit symbols are symbols representing types of the contact and the coil. In the execution code, the circuit symbols are equivalent to instructions.

The variables represent data set as processing targets of the circuit symbols (the instructions). Variable names registered in the [unit use variable name list] can be used. Circuit elements encircled in FIG. 6 are places where variable names corresponding to an "input unit 1" in FIG. 9 are used.

The created ladder program has a data structure in which the "circuit blocks" in which variables used for operating the units are used can be searched. The ladder program is stored in the program storing unit 4.

Note that, in this embodiment, the ladder program is explained as an example. However, when other programming languages such as an ST (Structured Text) and an FBD (Function Block Diagram) are used, the sequence-program-debugging supporting apparatus according to this embodiment can also be realized and the same effects can be obtained.

(Writing of an Execution Code)

The created ladder program is converted into an execution code, which is executable by the CPU 200, by the program converting unit 5 (the compiler). The execution code is written in the CPU 200 by the PLC communication unit 8 and is in an executable state.

Figure 7:
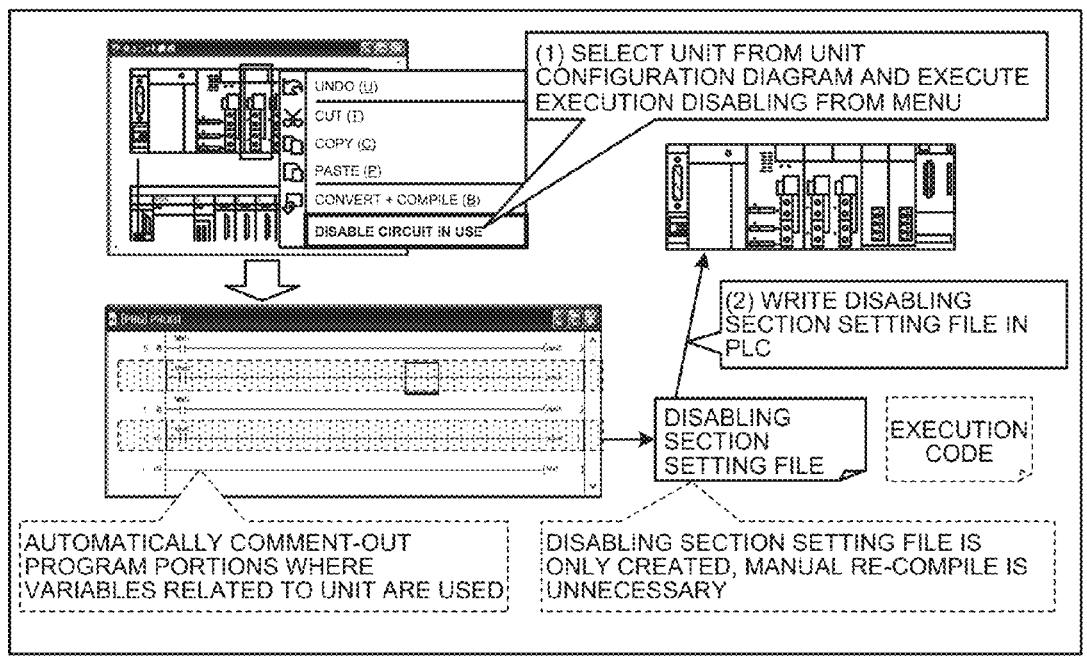
FIG. 7 is a diagram of a state of operation by a user and the operation of the sequence-program-debugging supporting apparatus according to the first embodiment.

On the basis of the above, a function for "not executing a program related to a specific unit" during debugging of a program for the PLC system is realized by the sequenced-program-debugging supporting apparatus 50. Operation by the user and the operation of the sequence-program-debugging supporting apparatus 50 in realizing this function are explained below with reference to FIG. 5 of a processing flow and FIG. 7 of a state of processing.

(Execution Disabling Operation for a Program that Uses a Unit)

Figure 5:
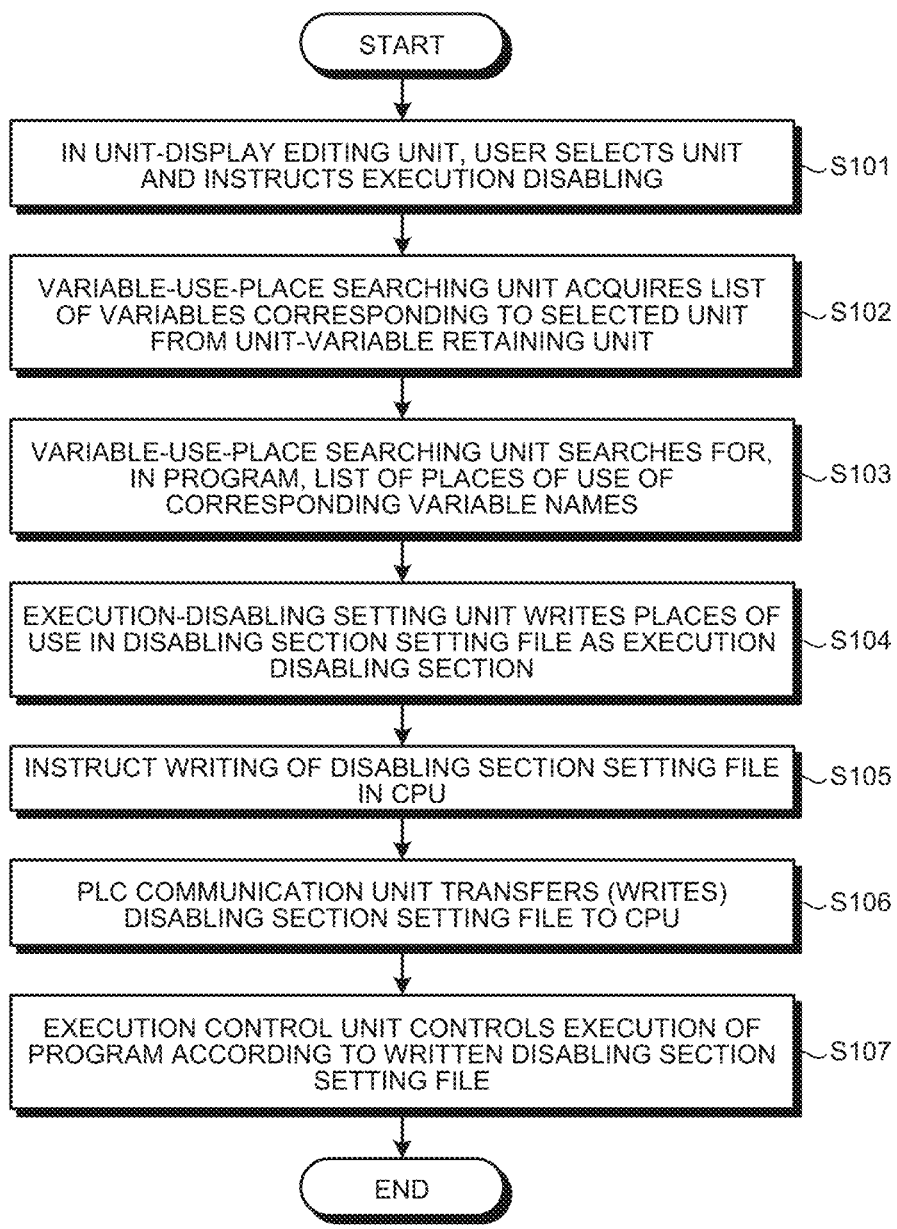
FIG. 5 is a diagram of a processing flow for explaining the operation of the sequence-program-debugging supporting apparatus in the first embodiment.

First, at step S101 in FIG. 5, the user disables execution of a program that uses a specific unit. An operation image at this point is an operation image shown in "(1) select a unit from a unit configuration diagram and execute execution disabling from a menu" in FIG. 7. Specifically, the user selects a unit on a unit configuration diagram of the unit-configuration-display editing unit 1 and executes "disabling of a circuit in use" in the menu. This operation can be also performed using a key or a tool bar button. The unit-configuration-display editing unit 1, which receives an identifier (a unit name) of the selected unit, notifies the variable-use-place searching unit 6 of the identifier (the unit name) of the unit.

(Acquisition of a List of Variables Corresponding to the Unit)

The variable-use-place searching unit 6 notified of the identifier (the unit name) of the unit acquires a list of unit variables used by the unit from the unit-variable retaining unit 2 (step S102). Specifically, for example, if the notified unit name is "input unit 1", the variable-use-place searching unit 6 acquires, using the unit name as a key, a use variable name list from FIG. 9 registered in the (registration of a list of unit variables) explained above. Therefore, in this example, the variable-use-place searching unit 6 acquires four variables "X0, X1, X2, and X3".

(Search for a Variable Use Place List)

The variable-use-place searching unit 6 searches for, concerning the four variables acquired in the (acquisition of a variable list corresponding to the unit), a list of places where the variables are used in the program (step S103). Note that, for a reduction in a debugging work time, the user can be enabled to select a variable to be disabled out of the acquired four variables. That is, an option for searching for, concerning only the variable selected by the user out of the four variables, a list of places where the variable is used in the program can be added. For example, the option is an option for enabling the user to designate that, for example, a variable corresponding to an input device is used (not disabled) but a variable corresponding to an output device is not used (disabled). When such an option is not added, the variable-use-place searching unit 6 searches for, concerning each of all the acquired four variables, places of use in the ladder program shown in FIG. 6. As a result, in an example of the ladder program shown in FIG. 6, variables in three places shown in FIG. 10 are obtained. Circuit blocks, which are the places of use, are found. The variable hit by the search are encircled and shown in FIG. 6. Note that, in the example explained in this embodiment, one ladder program is set as the target. However, this system is also effective when a plurality of programs is set as targets.

(Execution Disabling Setting for the Places of Use)

The execution-disabling setting unit 7 sets, concerning the three places in the ladder program shown in FIG. 6 where the variables found in the "search for a variable use place list) are used, a section of the execution code corresponding to the places as a section not to be executed, that is, a disabling second and writes the disabling section in a disabling section setting file (step S104). For example, it is assumed that an execution code of the target ladder program is recorded in a structure such as [correspondence between a ladder program and an execution section] shown in FIG. 11. Writing in the disabling section setting file can be realized by acquiring start step numbers and end step numbers of the three circuit blocks, which are the search result of the (search for a variable use place list), and writing the start step numbers and the end step numbers to [disabling section setting" shown in FIG. 12.

Note that, in the explanation in this embodiment, the disabling section created from the search result in the (search for a variable use place list) is written in the disabling section setting file in which no setting is described in the beginning. However, this system is also effective when a disabling section is added anew to a disabling section already written in the disabling section setting file and when a disabling section is rewritten.

(Instruction to Write the Disabling Section Setting in the CPU)

The user performs operation for writing the disabling section setting file created in the paragraph (execution disabling setting for the places of use) into the CPU 200. This operation can be realized by operation equivalent to operation such as "Write to PLC" or "Online Program Change" of the related art. Specifically, in the engineering tool 100 that receives an instruction of the user (step S105), the PLC communication unit 8 writes (transfers) the disabling section setting file in the CPU 200 (step S106). Note that this operation is executable even if the user does not give an instruction to the engineering tool 100, that is, even if step S105 is omitted. Specifically, when the disabling section setting file is updated in the "execution disabling setting for the places of use), the engineering tool 100 (the PLC communication unit 8) can automatically perform writing processing in the CPU 200 (step S106). A state of this processing is shown in "(2) write disabling section setting file in PLC" in FIG. 7.

(Execution Control for a Program Under Execution)

The CPU 200, which receives the disabling section setting file in the (instruction to write the disabling section setting in the CPU) (in which the disabling section setting file is written), controls, according to content of the disabling section setting, execution of an execution code being executed by the execution control unit 12 (step S107). Consequently, non-execution of the program in the places related to the unit selected in the (execution disabling operation for a program that uses a program). Specifically, the execution control unit 12 stops the execution of the execution code at a step number designated by a start step number of a disabling section (a break point function in the past) and then skips the execution to an end step number of the disabling section and continues the execution from the next step number.

Note that, when the execution control unit 12 performs the control, it can adjust execution speed in the case of disabling of the program by making it possible to designate a sleep time of the PLC system during non-execution of the program. For example, when it is desired to execute the program early, the execution control unit 12 can set the sleep time=0. However, when it is desired to execute the program at actual speed, the execution control unit 12 can estimate a sleep time from the number of steps of non-execution and cause the PLC system to sleep during the sleep time. Consequently, it is possible to reduce an execution time and make a debugging time efficient. Moreover, if the execution control unit 12 estimates a sleep time from the number of steps of non-execution and causes the PLC system to sleep, it is possible to simulate an execution state of a slowest case. That is, it is possible to perform debugging while simulating various environments.

As explained above, in the sequence-program-debugging supporting apparatus 50 according to the embodiment of the present invention, not to execute only an operation program related to a specific unit in a sequence program, the following three points are automatically executed.

(1) Acquire a list of variables related to a target unit.
(2) Acquire information concerning places (sections) in the sequence program where variables are used.
(3) Write setting for disabling execution concerning the places (the sections) acquired in (2) in a file without changing the sequence program and an execution code corresponding to the sequence program.

Consequently, the user can realize non-execution of an operation program related to a specific unit only by (1) selecting a target unit in a menu screen or the like and instructing execution disabling and (2) instructing to write, in a PLC, a file in which a disabling section is set (the instruction can be omitted when the sequence-program-debugging supporting apparatus is caused to automatically execute the instruction).

As a result, it is possible to collectively disable execution of portions related to the unit. Therefore, compared with a program correction work time in manually disabling the portions, it is possible to markedly reduce man-hour. Because the sequence-program-debugging supporting apparatus 50 manages information related to the unit, it is possible to reduce errors in determination and operation by a human. Therefore, compared with manual comment-out work, it is possible to reduce the number of times of work. Further, because the setting of the execution disabling according to this embodiment can be realized by a function of skipping a specific place of an existing execution code, the execution code is not changed. Therefore, the restart of the PLC in the past is unnecessary. Consequently, there is an effect that it is possible to reduce time for debugging work, that is, reduce a work time for creation of a sequence program including the debugging work and make the debugging work efficient.

Second Embodiment

In the first embodiment, in the (execution disabling operation for a program that uses a unit), the user manually selects, on the unit configuration diagram, a unit that the user desires to disable. However, it is also conceivable to omit this operation when a unit not mounted on a real machine system of the PLC is present.

Figure 13:
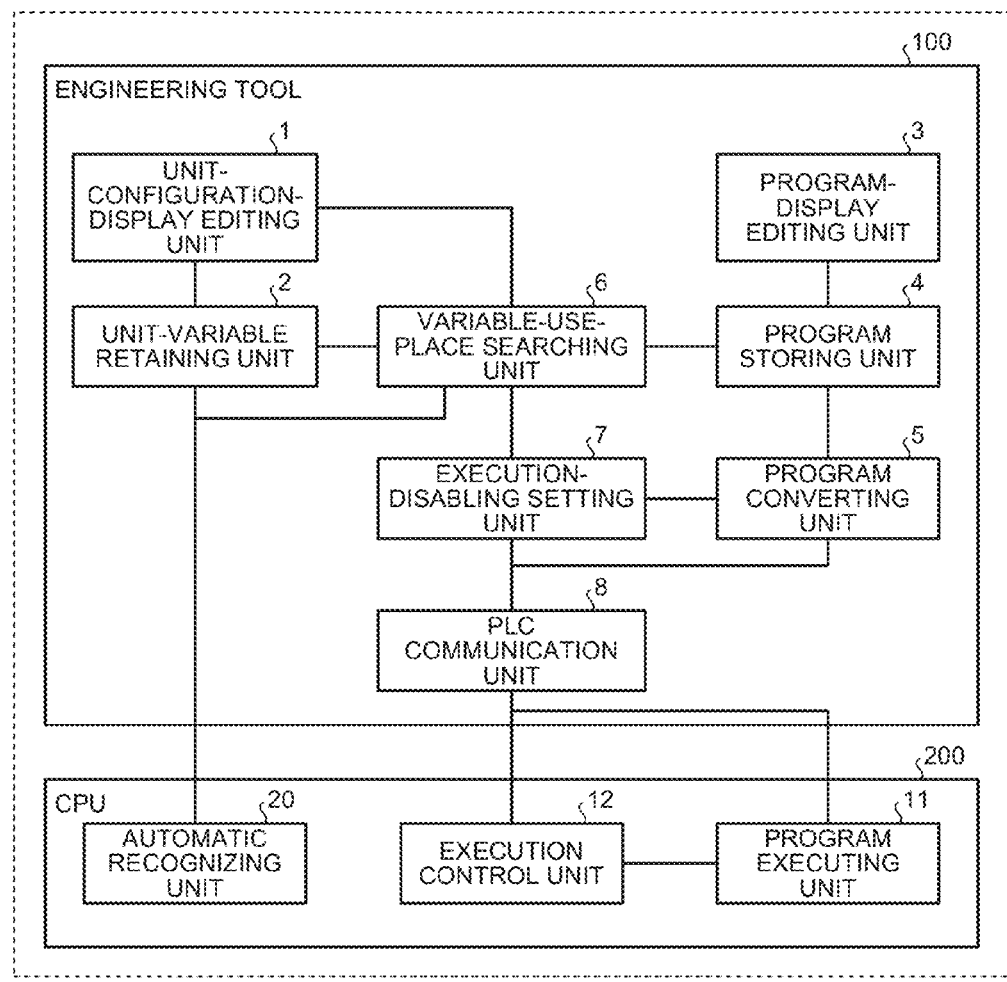
FIG. 13 is a diagram of a basic configuration of a sequence-program-debugging supporting apparatus according to a second embodiment.

In this embodiment, as shown in FIG. 13, an automatic recognizing unit 20 that has a function of automatically recognizing a unit (an unconnected unit) not mounted on a programmable logic controller (PLC) is included in the sequence-program-debugging supporting apparatus 50. The automatic recognizing unit 20 can be present only on the CPU 200 (hardware) side as shown in FIG. 13 and inform the engineering tool 100 (software) of a recognition result or can be shared by the CPU 200 and the engineering tool 100. An operation flow in this embodiment including the operation of the sequence-program-debugging supporting apparatus 50 is shown in FIG. 14.

Figure 14:
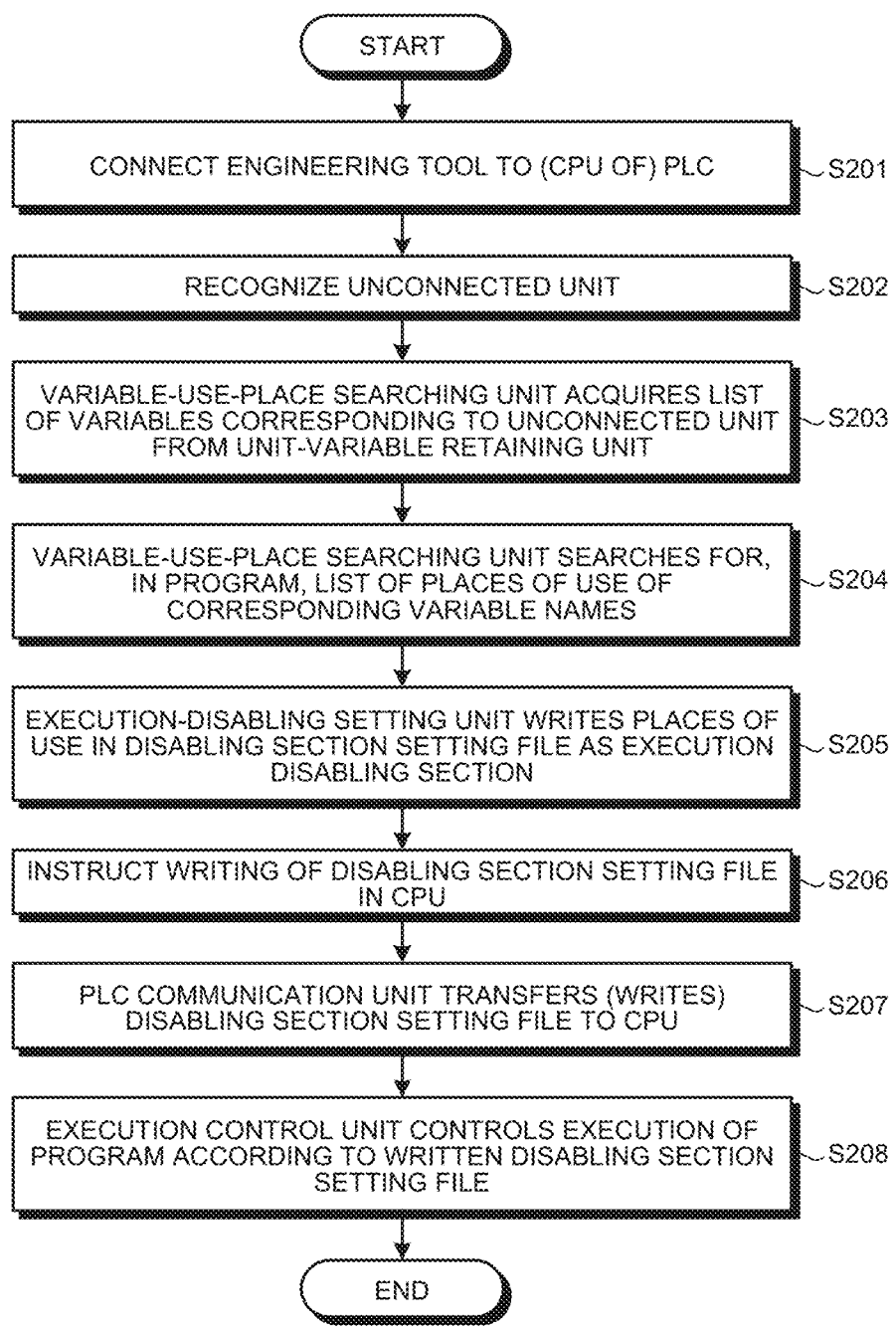
FIG. 14 is a diagram of a processing flow for explaining the operation of the sequence-program-debugging supporting apparatus in the second embodiment.

First, at step S201 in FIG. 14, the engineering tool 100 is connected to (the CPU 200 of) the PLC by USB connection or network connection. Then, the sequence-program-debugging supporting apparatus 50 automatically recognizes a system configuration as explained above on the basis of a connection state of the PLC. Consequently, the sequence-program-debugging supporting apparatus 50 recognizes an unconnected unit arranged on the unit configuration diagram of the unit-configuration-display editing unit 1 shown in FIG. 7 but not connected to the real machine of the PLC (step S202). The variable-use-place searching unit 6 informed of an identifier (a unit name) of the unconnected unit, that is, an automatic recognition result acquires a list of unit variables used by the unconnected unit from the unit-variable retaining unit 2 (step S203).

That is, in the second embodiment, a unit automatically recognized as the unconnected unit is treated as the unit selected by the user in the first embodiment. Therefore, subsequent steps S204 to S208 are the same as steps S103 to S107 in FIG. 5. Note that, in this embodiment, when the unconnected unit is connected, that is, a sequence program (e.g., a ladder program) of a PLC system shown on the unit configuration diagram of the unit-configuration-display editing unit 1 is converted into an execution code by the program converting unit 5 and written in the CPU 200 in advance and is in an executable state. Further, if step S206 is omitted as in the first embodiment, when a unit mounted on a real machine system of a PLC is present, it is possible to substantially automatically fully automatically create an execution code of a sequence program corresponding to the PLC.

In the explanation in the first and second embodiments, variables to be disabled are selected in units of a unit first. However, rather than selecting a unit from the beginning, it is also possible to designate variable in the beginning on the basis of a cross reference result (a search result) or the like and enable commend-out switching of a program (an execution code) that uses the variables. During creation of a sequence program, for example, by combining a scheme same as a macro of a C language (e.g., a scheme such as "#ifdef DEBUG create a disabling section setting file", it is possible to write a program for causing the execution-disabling setting unit 7 to operate only during debugging and executing creation of a disabling section setting file. Consequently, it is possible to flexibly customize a portion, execution and non-execution of which are desired to be switched, of the execution code can be flexibly customized according to the comment-out operation according to the embodiment. Therefore, it is possible to make the debugging work more efficient.

Further, the present invention is not limited to the embodiment and can be variously modified without departing from the spirit of the present invention in an implementation stage. Inventions in various stages are included in the embodiments. Various inventions can be extracted according to appropriate combination in the disclosed constituent elements. For example, even if several constituent elements are deleted from all the constituent elements described in the embodiments, when the problems explained in the section of the technical problem can be solved and the effects explained in the advantageous effects of invention can be obtained, a configuration from which the constituent elements are deleted can be extracted as an invention. Further, the constituent elements described in the different embodiments can be combined as appropriate.

INDUSTRIAL APPLICABILITY

As explained above, the sequence-program-debugging supporting apparatus according to the present invention is useful for debugging work for a sequence program of a PLC system and, in particular, suitable for debugging work for a sequence program that uses an engineering tool.

REFERENCE SIGNS LIST

1 Unit-configuration-display editing unit
2 Unit-variable retaining unit
3 Program-display editing unit
4 Program storing unit
5 Program converting unit
6 Variable-use-place searching unit
7 Execution-disabling setting unit
8 PLC communication unit
11 Program executing unit
12 Execution control unit
20 Automatic recognizing unit
50 Sequence-program-debugging supporting apparatus
100 Engineering tool
200 CPU
S101 to S107, S201 to S208 Steps

The invention claimed is:
1. A sequence-program-debugging supporting apparatus comprising:
an engineering tool including:
a unit-configuration-display editing unit that receives a disabled unit selected by a user from units included in a programmable logic controller;
a unit-variable retaining unit that retains, for each of the units, a variable used by the units on a sequence program executed by the programmable logic controller;
a program-display editing unit with which the user can edit the sequence program;
a program storing unit that stores the sequence program;

a program converting unit that converts the sequence program into an execution code executable by a program executing unit of the programmable logic controller;

a variable-use-place searching unit that acquires variables used by the disabled unit from the unit-variable retaining unit and searches for places where the acquired variables are used in the sequence program; and an execution-disabling setting unit that writes a section of the execution code corresponding to the places in a disabled section setting file, as a disabled section not to be executed; and an execution control unit that controls, on the basis of the disabled section setting file, the program executing unit not to execute the disabled section.

2. The sequence-program-debugging supporting apparatus according to claim 1, further comprising an automatic recognizing unit that recognizes, as an unconnected unit, a unit not connected to the programmable logic controller, wherein the variable-use-place searching unit sets, as the disabled unit, the unconnected unit recognized by the automatic recognizing unit.

3. The sequence-program-debugging supporting apparatus according to claim 1, wherein the variable-use-place searching unit searches for a place where a variable selected by the user out of the acquired variables is used in the sequence program.

* * * * *